United States Patent [19]

Huynh-Tran et al.

[11] Patent Number: 4,722,969
[45] Date of Patent: Feb. 2, 1988

[54] STORAGE STABLE, LOW TEMPERATURE, SOLVENTLESS, CURABLE URETHANE COMPOSITION

[75] Inventors: Truc-Chi Huynh-Tran, Laurel; Shiow C. Lin, Ellicott City, both of Md.

[73] Assignee: W. R. Grace & Co., New York, N.Y.

[21] Appl. No.: 909,041

[22] Filed: Sep. 18, 1986

[51] Int. Cl.$^4$ .............................................. C08G 18/30
[52] U.S. Cl. ..................................... 525/123; 525/124; 525/127; 525/128; 525/129; 528/45; 528/49; 528/77; 528/81; 528/83
[58] Field of Search ............... 525/123, 124, 127, 128, 525/129; 528/77, 81, 83, 45, 49

[56] References Cited

U.S. PATENT DOCUMENTS

| | | | |
|---|---|---|---|
| 3,583,943 | 6/1971 | Weber et al. | 528/45 |
| 3,660,355 | 5/1972 | Johnson et al. | 525/124 |
| 3,676,402 | 7/1972 | Matsui et al. | 528/58 |
| 3,694,389 | 9/1972 | Levy | 524/765 |
| 3,857,818 | 12/1974 | Frizelle | 525/124 |
| 3,984,365 | 10/1976 | Lienert et al. | 524/158 |
| 4,046,744 | 9/1977 | Jenkins | 427/385.5 |
| 4,373,081 | 2/1983 | Nachtkamp et al. | 528/45 |
| 4,403,086 | 9/1983 | Holubka et al. | 528/45 |
| 4,409,340 | 10/1983 | Stolzenbach et al. | 521/159 |
| 4,530,859 | 7/1985 | Grunzinger | 427/320 |
| 4,546,166 | 10/1985 | Niinomi et al. | 528/60 |

FOREIGN PATENT DOCUMENTS 3228670  2/1984  Fed. Rep. of Germany.

*Primary Examiner*—Maurice J. Welsh
*Assistant Examiner*—S. A. Acquah
*Attorney, Agent, or Firm*—Richard P. Plunkett; William W. McDowell, Jr.

[57] ABSTRACT

A one component, solventless, storage stable, low temperature, curable urethane composition comprising (1) a branched, blocked isocyanate prepolymer comprising the reaction product of a polyol having a functionality of at least 2, an aromatic polyisocyanate having a functionality of at least 2, the combined functionality of the polyol and the polyisocyanate being greater than 4 and a ketoxime blocker;

(2) a polyol crosslinking agent containing at least two OH groups;

(3) a deblocking and curing catalyst for (1); and (4) a dessicant.

The composition on heating to 100°-120° C. results in a cured polyurethane within 10-30 minutes. The composition can also be combined with polymeric powder, e.g., polymethylmethacrylate to yield cured reactive plastisols. The aforesaid compositions are useful as sealants, coatings or adhesives.

5 Claims, No Drawings

STORAGE STABLE, LOW TEMPERATURE, SOLVENTLESS, CURABLE URETHANE COMPOSITION

BACKGROUND OF THE INVENTION

1. Field of the Invention

This invention relates to a novel, curable urethane composition and to a process of preparing novel formulations using the same. More particularly, this invention relates to a novel, curable, one component, solventless, blocked isocyanate composition and to a process of preparing compositions using said novel, blocked isocyanate compositions.

2. Description of the Prior Art

Blocked isocyanate compositions are well known in the art. U.S. Pat. No. 3,583,943 teaches a curable coating composition comprising (a) a ketoxime, blocked isocyanate, terminated reaction product of a polyhydroxyl compound with an isocyanate, said reaction product having a molecular weight of from about 8,000 to about 15,000 and (b) a tertiary amino alcohol having at least two hydroxyl groups. U.S. Pat. No. 3,694,389 teaches a thermosetting coating composition comprising a ketoxime-blocked isocyanate and a solution copolymer of a mixture of ethylenically unsaturated and active hydrogen-containing compounds. U.S. Pat. No. 3,660,355 teaches novel thermosetting resin powders which can be molded to form urethane crosslinked products which are prepared by reacting hydroxyfunctional, acrylic polymer particles with a mono-blocked diisocyanate. U.S. Pat. No. 3,676,402 teaches octaalkylstannoxanes as regenerative agents of an isocyanate group and a blocked isocyanate compound at temperatures lower than previously possible. U.S. Pat. No. 3,857,818 teaches a powdered coating composition comprising a free flowing mixture of a solid, ketoximerblocked isocyanate prepolymer and one or more solid, hydroxyfunctional resins such as the polyester resin. U.S. Pat. No. 3,984,365 teaches an aqueous solution of bisulfate-blocked polyisocyanate prepolymers having storage stability up to about 45° C. by incorporation of about 0.5 to 20% by weight of the prepolymer of an aromatic or alkyl aromatic, sulfonic acid. U.S. Pat. No. 4,046,744 teaches a low temperature, one component, thermosetting coating composition comprising a ketoxime-blocked polyisocyanate and an oxazolidine. U.S. Pat. No. 4,403,086 teaches high solid, solvent-based, thermosetting resin coating compositions comprising chain-extendable, crosslinkable, low molecular weight polyol, diblocked diisocyanate and crosslinking agent reactive with a polyol, but substantially unreactive with the isocyanate functionality. U.S. Pat. No. 4,409,340 teaches a heat curable, coating composition comprising a prepolymer with ketoxime-blocked NCO groups which are linked to the prepolymer via cycloaliphatic and/or aliphatic groups, a diamine crosslinker and an organic solvent. U.S. Pat. No. 4,373,081 teaches thermally crosslinkable, coating compositions which are liquid and storage stable at room temperature and which contain combinations of dialkyl-malonate-blocked polyisocyanates and organic polyhydroxyl compounds as binders.

Additional patents in the literature which are involved with low temperature cured, blocked isocyanate compositions include U.S. Pat. No. 4,546,166; U.S. application having Ser. No. 333,810, filed Dec. 23, 1981; and German Offenlegungsschrift DE No. 32 28 670.

However, most of the compositions cited do not provide sufficient shelf life. For instance, in U.S. Pat. No. 4,546,166, although it is claimed that the polyurethane composition can be cured at 80°-100° C., the cured time is much longer than the required 30 minutes (i.e., 2 to 4 hours), and the composition is not storage stable because polyisocyanates used are not blocked. In another case, i.e., U.S. application having Ser. No. 333,810, filed Dec. 23, 1981, although the composition is based on blocked isocyanate chemistry and the cured temperature reported is 115° C. for 30 minutes, the composition is not solventless. Further, in the case where storage stability was claimed (for 2 months at room temperature) in German Offenlegungsschrift DE No. 32 28 670, the cured temperature is significantly higher, i.e., 140° C., for 20 minutes.

In recent years, in the automotive industry, there has also been a drive towards lowering oven temperatures from about 140° C.–120° C. or lower. Polyvinyl chloride (PVC) plastisol is the major product being used in this area for sealant applications. PVC plastisols perform well at a processing temperature of 140° C., but lose their adhesion strength when cured at 120° C. due to poor plasticization. Thus, there has been a long-felt want for a material which is storage stable to be cured at 100° C. with high adhesive strength.

A further typical problem generally connected with urethane chemistry is the high reactivity of the isocyanate groups with water releasing carbon dioxide gas that causes foaming problems in the material on curing.

OBJECTS OF THE INVENTION

One object of the instant invention is to produce a composition which can be heat cured at 100°-120° C. Another object of the instant invention is to produce a composition which is storage stable for at least 3 days at temperatures up to 40° C. and more than 2 months at room temperature, i.e., 25° C. A further object of the instant invention is to produce a composition which on curing at temperatures in the range 100°-120° C. results in a thermoset having high adhesion strength.

A further object of the instant invention is to produce a composition which on curing at 100°-120° C. does not foam. A still further object of the invention is to provide a reactive plastisol composition. Other objects will become apparent from a reading hereinafter.

DESCRIPTION OF THE INVENTION

This invention relates to a one component, solventless, storage stable, low temperature curable urethane composition comprising (1) a branched, blocked isocyanate prepolymer comprising the reaction product of a polyol having a molecular weight in the range 400–4,000 and a functionality of at least 2, an aromatic polyisocyanate with a functionality of at least 2, the combined functionality of the polyol and the polyisocyanate being greater than 4, and a ketoxime blocking agent;

(2) a polyol crosslinking agent having a molecular weight in the range 90–4,000 and containing at least two OH groups;

(3) a deblocking and curing catalyst for (1); and (4) a desiccant.

The composition on heating to 100°-120° C. results in a cured thermoset material within 10-30 minutes. The composition can also be combined with polymeric powder, e.g., polymethylmethacrylate, to form curable, reactive plastisol compositions on exposure to heat. The aforesaid compositions are useful as coatings, adhesives and sealants.

The ketoxime-blocked isocyanate prepolymer component of the composition is usually formed neat in a nitrogen atmosphere. In one embodiment of the instant invention toluene diisocyanate is added to a polypropylene oxide triol (MW equals 1,000 g/mole) over an extended period of about 2 hours during which time the reaction mixture is kept under nitrogen with constant stirring. No heat is applied to the reaction until the exotherm (which heats the reaction temperature up to about 50° C.) subsides. The reaction is continued with heating up to about 60° C. until half of the isocyanate content has reacted. The ketoxime blocking agent, e.g., 2-butanoneoxime, is then slowly added to the reaction to maintain the exotherm at a temperature below 70° C. The reaction is usually complete about 2 hours after the addition of all the 2-butanoneoxime as determined by end group titation showing that the meq. NCO/g is 0.

The prepolymer is then formulated with the cross-linking agent, e.g., a polyol containing at least two hydroxyl groups, a deblocking and a curing catalyst for the prepolymer and the desiccant. Said formulation is storage stable for periods of at least 3 days at 40° C. or 2 months at room temperature, i.e., 25° C.

The branched, blocked isocyanate prepolymer can be formed in various ways as long as the prepolymer is branched, i.e., contains more than 2 (e.g., 2.1) terminal NCO groups, which are blocked with a ketoxime blocker. One preferred method is to stoichiometrically react 1 mole of a triol with 3 moles of a diisocyanate and, thereafter, block the remaining isocyanate groups with a stoichiometric amount of a ketoxime blocker. Another method is to react 1 mole of a diol with 2 moles of a polyisocyanate containing more than 2 NCO groups, e.g., PAPI, and, thereafter, block the remaining NCO groups with a ketoxime blocker. Mixtures of the aforesaid branched, blocked isocyanate prepolymers are also operable herein.

Substantially, any aromatic polyisocyanate, including prepolymers having terminal —NCO groups, can be used in making the blocked isocyanates for the compositions of the invention. As used in the present specification and claims, the terms "polyisocyanate" and "polyfunctional isocyanate" mean any aromatic compound, monomeric or polymeric, having two or more —NCO groups. The isocyanates which are used in the compositions of the invention are known materials.

Among the aromatic polyisocyanates which can be used in the compositions of the invention are tolylene diisocyanate, xylylene diisocyanate, dianisidine diisocyanate, 4,4'-diphenyl-methane diisocyanate, 1-ethoxy-2,4-diisocyanatobenzene, 1-chloro-2,4-diisocyanatobenzene, tris(4-isocyanatophenyl) methane, naphthalene diisocyanates, fluorene diisocyanates, 4,4'-biphenyl diisocyanate, phenylene diisocyanates, 3,3'-dimethyl-4,4'-biphenyl diisocyanate, p-isocyanatobenzyl) isocyanate, tetrachloro-1,3-phenylene diisocyanate, a polymethylene polyphenylisocyanate having an average —NCO functionality of 2.3 commonly referred to as polymeric MDI (PMDI) and related isocyanates such as PAPI, 2,4,6-tribromo-1,3-phenylene diisocyanate, bis(2-isocyanatoethyl) benzene, prepolymers of polyisocyanates with polyhydroxyl or polyamine compounds, such as prepolymers of 3-isocyanatomethyl-3,5,5-trimethyl-cyclohexylisocyanate, tolylene diisocyanate, mentane diisocyanate, 4,4'-methylenebis(cyclohexylisocyanate), 4,4'-methylene-bis(isocyanatocyclohexane), 2-isocyanato-ethyl-6-isocyanatocaproate, and the like with polyether polyols, polyester polyols, and the like.

The polyols used to form the blocked isocyanate prepolymer can be polyether or polyester diols, triols or tetraols.

As the polyether polyols mentioned above, there may be employed products obtained by the addition polymerization of one or more alkylene oxides such as ethylene oxide, propylene oxide, butylene oxide, or styrene oxide, to one or more polyols, as the initiator, such as ethylene glycol, diethylene glycol, propylene glycol, glycerol, trimethylol propane, hexanetriol, pentaerythritol, sorbitol, sucrose, mannitol, sorbide, mannitan, or sorbitan, or to amines such as ethylene diamine, propylene diamine, and ethanolamine under alkaline or acidic conditions. These polyether polyols may be prepared in a known manner as described in the publications entitled "High Polymer Vol. XIII, Polyethers Part 1" (1963) by Norman G. Gaylord published by Interscience Publishers, New York, N.Y. The molecular weight of the polyether polyols may be varied depending upon the purpose, and is generally selected from the range of about 300 to about 3,000, preferably about 400 to about 2,000.

As examples of the polyester polyols mentioned above, there is employed a product obtained by the reaction of one or more polyols such as ethylene glycol, propylene glycol, diethylene glycol, triethylene glycol, butylene glycol, trimethylol propane, glycerol, hexanetriol or pentaerythritol with one or more polycarboxylic acids such as oxalic acid, succinic acid, glutaric acid, adipic acid, pimetic acid, suberic acid, azelaic acid, sebacid acid, maleic acid, fumaric acid, itaconic acid, phthalic acid, isophthalic acid, terephthalic acid, or their acid anhydrides. These polyester polyols are prepared in a known manner as described in the publication entitled "Polyesters and their Application", April 1959, published by Bjorksten Research Lab., Inc., New York, NY. The molecular weight of the polyester polyols may vary depending upon the purpose desired, and is generally selected from the range of about 300 to about 3,000, preferably about 400 to about 2,000.

Another type of polyester polyols that can be used are the polycaprolactone polyols which can be prepared from ε-caprolactone with diols, triols or tetraols.

The polyols containing two or more OH groups used as the curing agent in the instant composition can be polyether or polyester, including polycaprolactone type polyols, and include those set out above to form the blocked isocyanate prepolymer.

The ketoxime blocking agent used to form the blocked isocyanate prepolymer can be selected from a wide variety of ketoximes. The choice of ketoxime is not critical and will depend mainly on the cost of the starting ketone, and may also depend in part on the volatility of the oxime. Among the oximes which can be used in making the ketoxime-blocked isocyanates are acetone oxime, 2-butanone oxime, 3-methyl-2-butanone oxime, 2-pentanone oxime, 3-pentanone oxime, 4-methyl-2-pentanone oxime, 2-heptanone oxime, 3-heptanone oxime, cyclohexanone oxime, actophenone oxime, and the like. An especially preferred ketoxime is the oxime of 2-butanone.

The deblocking and curing catalysts for the blocked isocyanate prepolymer can be selected from a wide combination of compounds including dibutyltin dilaurate, stanneous octoate, tetraethylene pentamine and tertiary aliphatic amines containing at least two hydroxyl groups. The catalysts are generally added in a quantity of from about 0.1 to about 0.5 parts per hundred (based on the total weight of the blocked isocyanate prepolymner plus the curing agents). Any suitable tertiary aliphatic amine containing at least two hydroxyl groups may be used according to the process of this invention and include such suitable amines as, for example, N-methyldiethanolamine, triisopropanolamine, triethanolamine, butyl dibutanolamine, propyl dipropanolamine, triisobutanolamine, N,N,N',N'-tetrakis(hydroxypropyl) ethylene diamine, N,N,N',N'-tetrakis(hydroxybutyl) ethylene diamine, N,N,N',N'-tetrakis(hydroxyethyl) ethylene diamine, N-mono(hydroxyethyl)N,N',N'-tris(hydroxypropyl) ethylene diamine, and the like. In the curable coating composition of this invention the tertiary amino alcohol acts both as a crosslinking agent and simultaneously as a catalyst for releasing the blocked or masked polyisocyanate.

Dessicants such as molecular sieves, calcium oxide, calcium sulfate, anhydrous magnesium sulfate, silica gel, etc., are operable herein and are usually added in amounts ranging from 15 to 50 weight percent based on the weight of the total weight of the blocked isocyanate prepolymer plus the curing agents.

When practicing the instant invention to form a reactive plastisol, the plastisol composition is made up of 100 parts of the one component urethane composition and 2-50, preferably 5-30, parts of the thermoplast powder. The thermoplast material can be formed from various polymers including, but not limited to, polyvinyl chloride, polymethacrylate, polyacrylate and polyacetals. The thermoplast powder usually has a particle size in the range from about 0.1 to about 1,500 microns. The reactive plastisols which rapidly turn to a fluxible or rubbery solid upon heating at a temperature above the fluxing point to provide handling mechanical strength are cured to an interpenetrating network at the same or more elevated temperature after fluxing. In these materials the plasticizer consisting of the curable urethane composition solvates the thermoplast at the fluxing temperature and, thereafter, at or above said fluxing temperature forms a thermoset material which interpenetrates the thermoplast.

The following examples are set out to explain, but expressly not limit, the instant invention. Unless otherwise noted, all parts and percentages are by weight.

EXAMPLE 1

Preparation of a Blocked Isocyanate Prepolymer Based on Polyol LG-168

To 1.5 mole (261.2 g) of toluene diisocyanate was added 0.5 mole (500 g) of Polyol LG-168 (polypropylene oxide triol); MW=1,000 g/mole) over a period of 2 hours. The reaction mixture was kept under nitrogen with constant stirring. The reaction was kept stirring without any application of heat until the exotherm (which heats the reaction temperature up to 50° C.) subsided. Then, the reaction mixture was heated up to 60° C. and kept for 3 hours or until half of the isocyanate content reacted. Next 1.5 moles (130.5 g) of 2-butanone oxime was added slowly to the reaction mixture (which was at 60° C.) to control the exotherm and to keep the reaction temperature below 70° C. The reaction was completed after 2 hours from the time of the addition of 2-butanone oxime and the completion of the reaction was determined via end group titration (0 meq. NCO/g resin left).

EXAMPLE 2

Preparation of a Blocked Isocyanate Prepolymer Based on Polyol-774

To 0.42 mole (72.5 g) of toluene diisocyanate at 60° C. was added 0.12 mole (500 g) of Polyol-774 (Polypropylene oxide triol; MW=3,600) with constant stirring under nitrogen. Polyol-774 was added over a period of 2 hours, and the reaction mixture was kept at 60° C. for 24 hours after which half of the isocyanate groups have reacted (determined via titration). Then 0.42 mole (36.3 g) of 2-butanone oxime was introduced at a rate such that the exotherm will not heat the temperature of the reaction above 70° C. The reaction is complete after 1 hour.

EXAMPLE 3

Formulation A

The blocked isocyanate prepolymer (BI-LG168) from Example 1 was formulated and cured as follows. To 100 parts (on a weight basis) was added: 1 part glycerol, 215 parts Polyol-816 (polypropylene oxide triol, MW=4,800 g/mole), 0.5 part dibutyltin dilaurate, 0.2 part tetraethylene pentamine, 110 parts of dry calcium carbonate, 48 parts of dry molecular sieves and 3.2 parts of Cab-0-Sil (hydrophobic fumed silica). The mixture was thoroughly mixed in a 3-roll mill to give a homogeneous, sag-resistant mixture.

The composition was cured at 100° C., 110° C. and 120° C. at 30, 20 and 10 minutes respectively to give homogeneous dense and no-foam materials with peel adhesion strength on a Uniprime surface of 21.0, 22.1 and 21.0 lbs/in$^2$, respectively.

EXAMPLE 4

Formulation B

The blocked isocyanate prepolymer prepared from Example 2 was compounded as follows. To 100 parts of the blocked isocyanate (BI-774) from Example 2 was added the following ingredients: 0.2 part glycerol, 0.5 part dibutyltin dilaurate, 0.2 part tetraethylene pentamine, 50 parts dry calcium carbonate, 20 parts molecular sieves powder. The mixture was passed through a 3-roll mill until a homogeneous mixture was obtained. The resulting mixture was subjected to curing at 100° C., 110° C. and 120° C. for 30, 20 and 10 minutes, respectively. The peel adhesion strength of the above composition on Uniprime surface are 33.0, 32.3 and 31.4 lbs/in$^2$ respectively following the above cured conditions.

EXAMPLE 5

Preparation of A Blocked Polyisocyanate 51.0 g (0.12 mole) of a commercially available polyether triol (M.Wt. 440) was added dropwise under nitrogen to 63.0 g (0.36 mole) of toluene diisocyanate. The subsequent exothermic reaction raised the reaction temperature to 40° C. The reaction was then kept stirring for 3 more hours after which the viscosity of the reaction mixture increased significantly. In order to facilitate mixing, the reaction mixture was heated to 60° C. While at this temperature, 121.5 g (0.06 mole) of a polyether diol (PPG-2025) was introduced slowly to the reaction mixture over a period of about 1 hour. The reaction was then allowed to proceed for 1 more hour at 60° C. after which the isocyanate end group titration indicates 1.0600 meq NCO/g resin left. At this point, 21.0 g (0.24 mole) of 2-butanone oxime was added slowly to the flask such that the exotherm will not raise the reaction temperature above 70° C. The reaction was then allowed to proceed for 2 more hours at 60° C. until the isocyanate level is zero. The resulting blocked polyisocyanate is a high viscosity, amber liquid at room temperature.

EXAMPLE 6

Preparation of Polymethylmethacrylate (PMMA) Plastisol

The urethane composition as in Example 3 can be combined with polymethylmethacrylate powder to give strong and tough PMMA plastisol. 10.0 g of Formulation A is mixed with 0.5 to 2.0 g PMMA powder and cured at 120° C. for 30 minutes. The resulting samples are completely fluxed to yield strong elastomers with increased hardness and exhibit excellent adhesion to Uniprime surface.

100 parts of a prepolymer mixture as in Formulation A (Example 3) (without any fillers) was mixed with 5 parts by weight of PMMA powder and cured at 120° C. for 30 minutes. A clear and transparent elastomer with excellent adhesion to Uniprime surface was obtained.

The example was repeated except that 20 parts by weight of PMMA powder were used. The results were the same.

We claim:
1. A reactive plastisol composition comprising:
(A) a one component, solventless, storage stable, low temperature curable urethane composition comprising:
  (1) a branched, blocked isocyanate prepolymer comprising the reaction product of a polyol having a functionality of at least 2, an aromatic polyisocyanate having a functionality of at least 2, the combined functionality of said polyol and said polyisocyanate being greater than 4 and a ketoxime blocker;
  (2) a polyol crosslinking agent containing at least two OH groups;
  (3) a deadlocking and curing catalyst for (1); and
  (4) a dessicant; and
(B) 2-50 parts by weight for each 100 parts of component (A) of a thermoplast material in powder form having a particle size in the range 0.1-1500 microns; said thermoplast material being a member of the group consisting of polyvinyl chloride, polyacrylate, polymethacrylate, polyacetal and mixtures thereof.

2. The process of forming a solidified homogeneous mass which comprises heating the composition of claim 1 at a temperature of at least 100° C. for a time sufficient to cause the mass to flux and become thermoset.

3. The composition of claim 1 as a coating.
4. The composition of claim 1 as a sealant.
5. The composition of claim 1 as an adhesive.

* * * * *

UNITED STATES PATENT AND TRADEMARK OFFICE
CERTIFICATE OF CORRECTION

PATENT NO. : 4,722,969

DATED : February 2, 1988

INVENTOR(S) : Truc-Chi Huynh-Tran et al

It is certified that error appears in the above-identified patent and that said Letters Patent is hereby corrected as shown below:

<u>In the Claims</u>:

In column 8, claim 1, line 15; delete the word "deadlocking" and insert therefor the word --deblocking--.

Signed and Sealed this

Twelfth Day of July, 1988

Attest:

DONALD J. QUIGG

Attesting Officer

Commissioner of Patents and Trademarks